T. RHOADS.
Horse Hay-Forks.

No. 138,286.  Patented April 29, 1873.

Witnesses:
Edward Rose
Wm Gilman

Inventor:
Thomas Rhoads

UNITED STATES PATENT OFFICE.

THOMAS RHOADS, OF OTTAWA, ILLINOIS.

IMPROVEMENT IN HORSE HAY-FORKS.

Specification forming part of Letters Patent No. 138,286, dated April 29, 1873; application filed February 17, 1873.

*To all whom it may concern:*

Be it known that I, THOMAS RHOADS, of Ottawa, in the county of La Salle and State of Illinois, have invented certain Improvements in Hay-Forks, of which the following is a specification:

My invention consists in an attachment to an ordinary hand hay-fork, with either three or four tines, or to a manure-fork, by which such a fork is transformed into a good and efficient horse hay-fork, very much cheaper than the implements constructed hitherto for that purpose; besides, by taking off the attachment, the fork can again be used as before.

Figure 1:
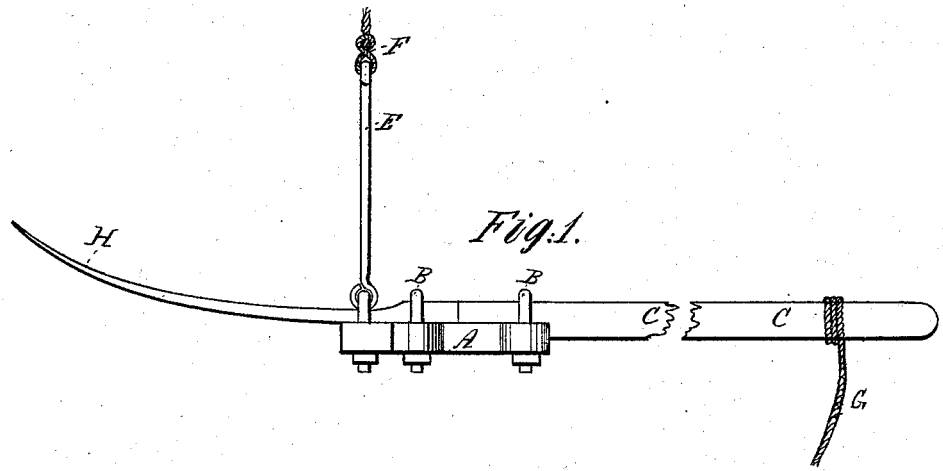
Figure 2:
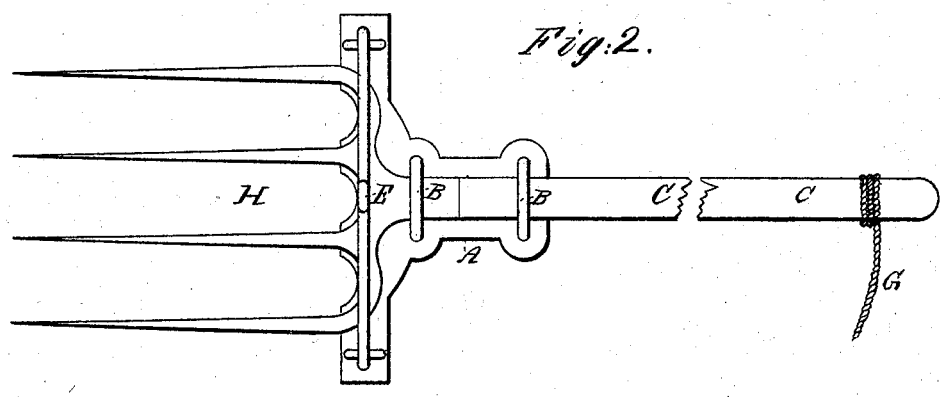
Figure 3:
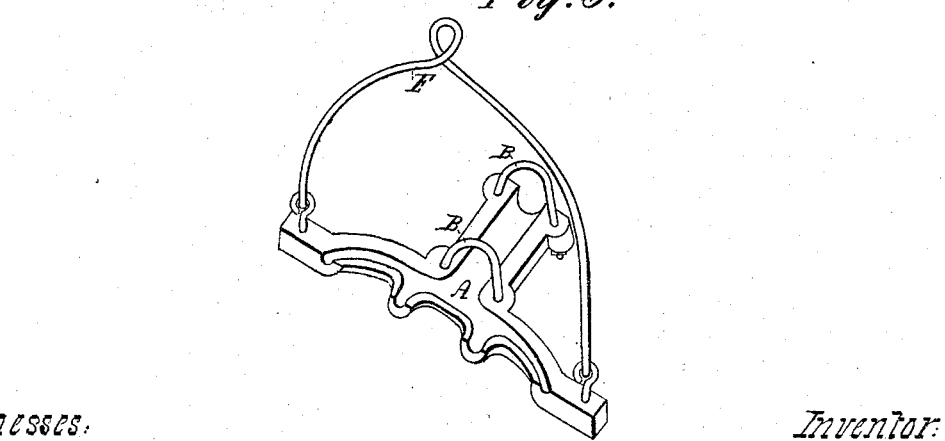

Figure 1 is a side elevation of a machine embodying my invention. Fig. 2 is a plan of the same. Fig. 3 is a perspective view of the attachment without the fork.

I make a casting of iron or other metal in the form shown at A, Fig. 3. In this casting A are inserted two staples, B B, for the purpose of securing the fork-handle C by means of the four nuts below. Two other staples or rings, D D, receive the bail E, which has at its upper part a ring, through which is fastened the rope F. Another rope, or cord, or chain, G, is attached to the end of the fork-handle C, either by tying it thereto or by means of a staple inserted into the fork-handle.

The manner of operating is as follows: The rope F is passed over a pulley on the derrick and a horse hitched to it. The fork H is then stuck into the hay straight down, after which the operator pulls on the cord G, the horse pulling at the same time, thus bringing the implement into the position shown in Fig. 1. After the fork full of hay is swung over into place, the operator slacks the cord G, when the weight of the hay on the fork H will cause the latter to tilt over and drop the hay upon the stack or heap, after which the operation recommences as before.

What I claim as my invention is—

The casting A with staples B B, staples D D, and bail E, as an attachment to a common hand, hay, or manure fork, so that the same may be used as a horse hay-fork, substantially as described.

THOMAS RHOADS.

Witnesses:
EDWARD ROSE,
WM. GILMAN.